Oct. 16, 1934. R. L. PUCCINELLI Re. 19,342
DEHYDRATOR
Original Filed June 29, 1921 2 Sheets-Sheet 1
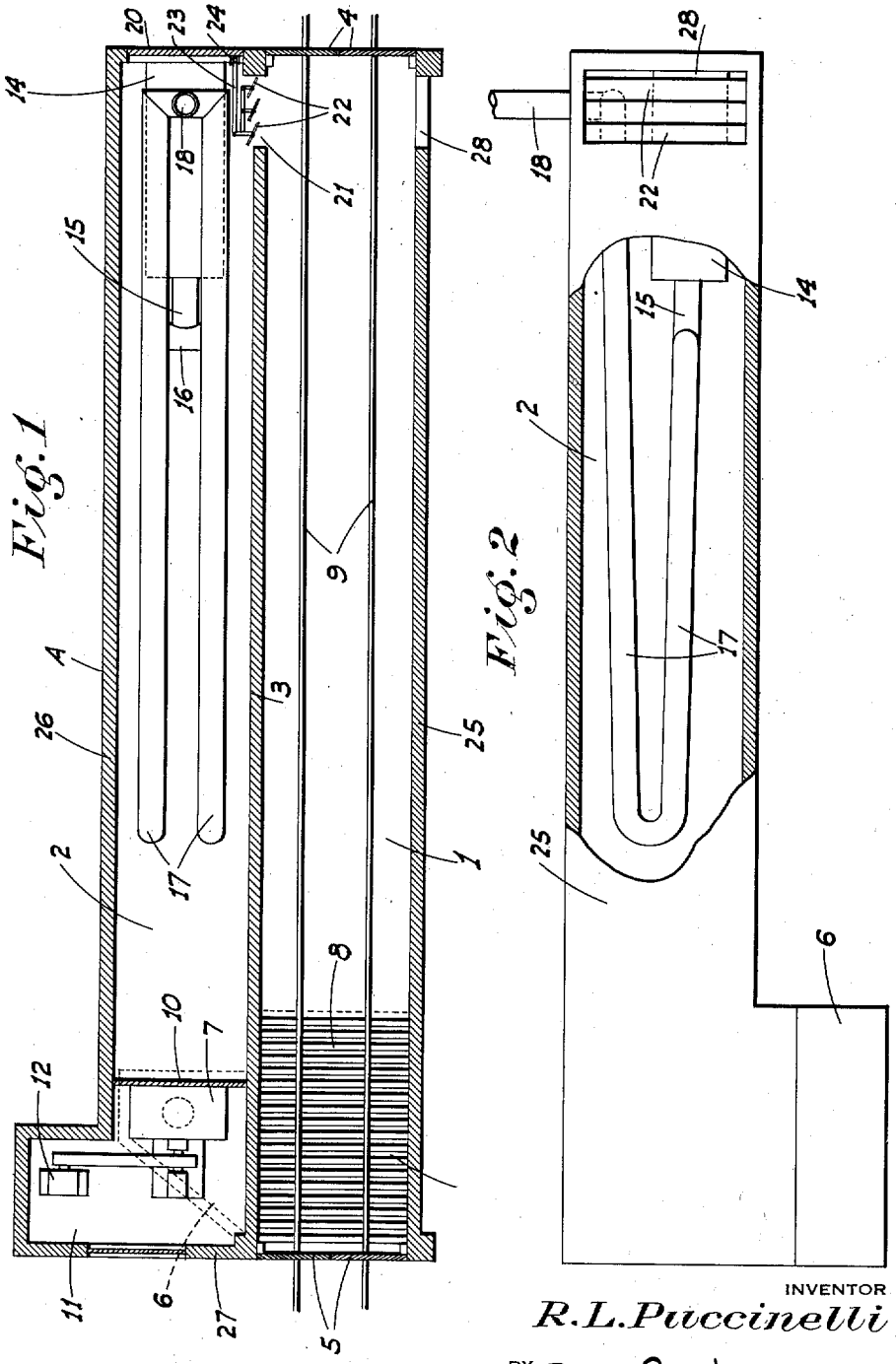
INVENTOR
R. L. Puccinelli
BY
ATTORNEY Oct. 16, 1934. R. L. PUCCINELLI Re. 19,342

DEHYDRATOR

Original Filed June 29, 1921 2 Sheets-Sheet 2

INVENTOR

R. L. Puccinelli

BY

ATTORNEY

Reissued Oct. 16, 1934

Re. 19,342

UNITED STATES PATENT OFFICE 19,342

DEHYDRATOR

Romolo L. Puccinelli, San Francisco, Calif., assignor to Chapman Dehydrator Company, Modesto, Calif., a corporation Original No. 1,464,338, dated August 7, 1923, Serial No. 481,242, June 29, 1921. Application for reissue July 24, 1933, Serial No. 681,935

5 Claims. (Cl. 34—46)

This invention relates to dehydrators of the type adapted for handling fruits, vegetables and like products, and especially to improvements in the construction and arrangement thereof which will permit greater thermal efficiency; economical handling of the product to be dried; and greater uniformity as far as results are concerned.

Among the objects sought are:

Reduction of heat losses by radiation and conduction.

A structure in which resistance or obstruction of air flow and distribution thereof is practically negligible.

Recirculation of all or part of the air and thorough mixing of same with fresh air when desired.

A novel arrangement of dampers to automatically regulate humidity of air, volume or proportion of air recirculated and volume of outside or fresh air admitted.

Time and labor saving means whereby entry and removal of the product may be accomplished without entering the drying tunnel.

Further objects will hereinafter appear.

The invention consists of the parts and the construction, combination and arrangement of parts as hereinafter more fully described and claimed, having reference to the accompanying drawings, in which:

Fig. 1 is a plan view in section of the dehydrator.

Fig. 2 is a side elevation partly broken away.

Figure 3:
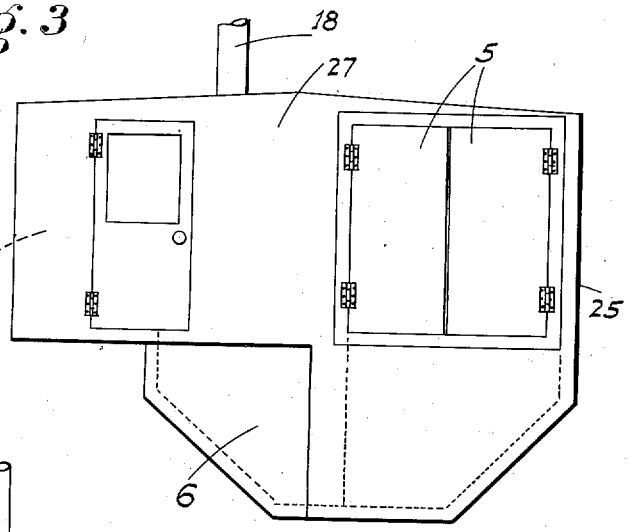
Fig. 3 is an end view of the outlet end of the dehydrator.
Figure 4:
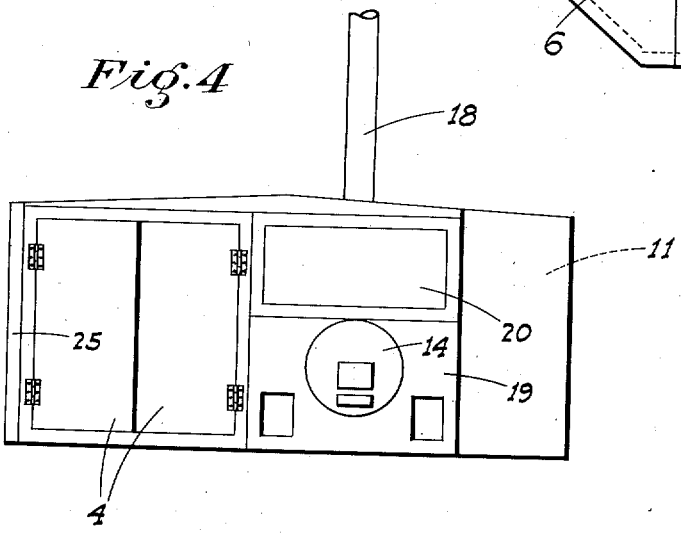
Fig. 4 is an end view of the furnace end of the dehydrator.
Figure 5:
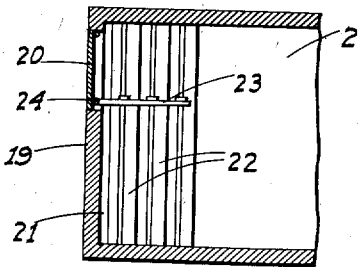
Fig. 5 is a detail sectional view showing the arrangement of the dampers whereby the volume of air recirculated, and the volume of outside air admitted is regulated.
Figure 6:
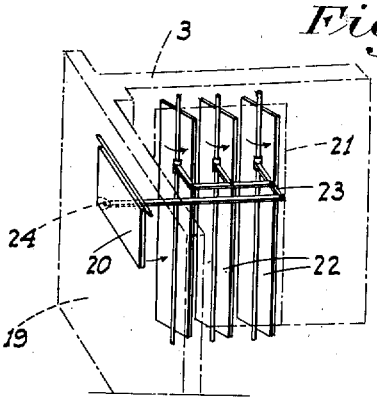
Fig. 6 is a perspective view showing the position of the dampers 20 and 22 and the operating levers connecting the same.

Referring to the drawings in detail, and particularly to Figs. 1 and 2, A indicates in general a dehydrator of the tunnel type in which is formed a drying tunnel 1, and a furnace chamber 2. The tunnel and the furnace chamber are arranged side by side and they are separated by a partition wall 3. Forming an entrance to the drying tunnel is a pair of doors 4, and forming an outlet therefor at the opposite end is a pair of doors 5. Arranged near the outlet end of the tunnel is a transverse duct 6. This duct communicates with the discharge end of the furnace chamber and a blower 7 placed therein, and it also communicates with the discharge end of the drying tunnel 1 as clearly illustrated in Figs. 1 and 3. Forming a partial closure for the transverse duct 6, and also serving the function of directing and deflecting the air admitted to the drying tunnel is a series of grate bars 8, and supported thereby, or by any other suitable means, is a track 9 which extends from end to end through the tunnel for purposes to be hereinafter described.

Arranged directly above the intake end of the transverse duct 6 is the blower 7, which may be of any suitable construction. Mounted directly in front thereof is a partition plate 10, which forms a closure for one end of the furnace chamber. Formed in said partition plate however is a central opening which forms the suction side of the blower and formed in the bottom of the blower casing is a discharge opening which opens into the transverse duct 6 to deliver the air thereto. The partition plate 10 not only forms a closure for the furnace chamber, but it also forms a separate compartment at the end of the furnace chamber as indicated at 11; this compartment being provided for the reception of an electric motor 12 or any other suitable means whereby the blower may be driven, and to this extent might be termed, the engine room of the plant. Arranged at the opposite end of the furnace chamber is a furnace 14 of any suitable construction. This furnace may be fired with wood, coal, oil or whatever fuel may be most advantageously and economically obtained where the plant is in operation, and it can therefore be seen that the particular type of furnace employed is of no importance as it will naturally be adapted for the fuel employed. Forming an outlet from the furnace 14 is a flue 15, which terminates in a T-connection 16, and connected therewith is a pair of discharge flues 17 which are placed side by side and extended from one end of the furnace room to the other; said flues being finally returned and combined so as to connect with a discharge stack 18.

Disposed directly above the furnace and in the end wall indicated at 19 is a damper 20, and formed in the partition wall 3, between the furnace chamber and the inlet end of the drying tunnel, is an opening 21 in which is mounted a plurality of vertically disposed dampers 22. These dampers are supported on individual shafts adapted to be turned in unison by means of a lever 23, and this lever is in turn connected with the damper 20 as shown at 24 in such a manner that opening of the dampers 22 will cause partial closing of the damper 20 and vice versa. This is of considerable importance as it automatically regulates the volume of humid air recirculated and conversely the volume of fresh or outside air admitted.

The structure as a whole may be built up of hollow tile and reinforced concrete. This makes a building or structure that is durable, fireproof and heat retaining. The building consists of the outside walls indicated at 25 and 26, the center partition wall 3, the end wall 19, and the end wall 27, forming a part of the engine room previously referred to. The walls may be suitably tied and roofed over, and the several tunnels or chambers are thus formed; the drying tunnel being normally closed by the doors indicated at 4 and 5, which are only opened when trucks loaded with fruit or the like are entered or removed. The operation will be as follows:

The fruit to be dried is preferably placed on trays provided with perforated bottoms, slots or the like. These trays are stacked on trucks which are entered by running them in on the tracks extending through the tunnel. The first truck admitted remains adjacent the inlet end or the doors 4 until the second truck has been loaded and is ready for the drier. The doors are then opened and the second truck entered. This will cause the first truck to move the length of one truck, and it can therefore be seen that as truck after truck is loaded and entered, that the first truck entered will finally reach the discharge end or the doors 5. In other words, the material to be dried is entered at the coolest end of the tunnel and discharged therefrom at the hottest end.

It can further be seen that the trucks are progressively advanced and that due to the length of the tunnel etc. complete evaporation should take place as each truck reaches the discharge end. Entrance, as far as laborers handling the trucks etc. are concerned, is not necessary as the trucks may be removed and entered through the doors indicated at 4 and 5.

The motor 12 and the blower 7 are of course set in operation when the fruit is to be dried and fuel of whatever nature employed is similarly delivered to the furnace 14. The dampers 22 will in the beginning be turned to wide open position, while the damper 20 will be closed and the air contained within the furnace chamber and the drier will thus be recirculated until the humidity becomes too great; apparatus not here shown for determining the humidity and the temperature of the air being employed. The moment the humidity reaches a predetermined point, it is obvious that damper 20 will be partly opened and that the dampers 22 will be partially closed. The volume of air then recirculated will of course be smaller and the volume of outside air will be increased; a desired proportion of both being readily obtained by the operator when the plant is in continuous operation. As outside air is admitted through the damper 20, it can readily be seen that it will pass over and around the furnace 14 and between the coils formed by the discharge flues 17. Heat will in this manner be transferred to the air both by radiation and conduction, and a thorough mixture of the humid air recirculated and the fresh heated air admitted will be obtained before it enters the drying tunnel through the grate bars 8 as the air is passed through the blower before delivery to the tunnel. This is of great importance as stratification of humid air and air of varying temperatures within the drying tunnel is thus avoided and thorough mixing is obtained as each round of the air necessitates passage through the blower where the mixing is effected.

As a continuous volume of outside air is, comparatively speaking, being continuously admitted once the plant has been started, it is obvious that a certain volume of humid air will necessarily have to be discharged. To accomplish this I form an opening 28 in the wall 25 near the inlet end. This opening forms a free means of escape for excess air delivered and does not require dampers or the like for regulation, that is air, like many other fluids and the like, will generally follow the path of least resistance. The path of least resistance will in this instance be through the dampers 22 as there is a slight pressure above atmospheric pressure in the drying tunnel, while there is a slight vacuum at all times within the furnace chamber, due to the fact that this is connected with the suction side of the blower. The air entering the drying tunnel through the grate bars and forcing forwardly through the tunnel will therefore naturally try to escape from one pressure area to a lower pressure area. This causes the recirculation desired, which may of course be regulated by the position of the dampers. Air not recirculated will therefore build up a pressure and will consequently automatically escape through the opening 28.

The present dehydrator has proven exceedingly economical, as far as thermal efficiency is concerned, and this can readily be seen from the fact that the furnace chamber and the drying tunnel are arranged side by side and as these are separated merely by a partition wall, no heat loss can take place between the same either through radiation or conduction. In fact the only heat loss would be the slight loss caused by the conduction through the exterior walls 25 and 26, and that escaping with the discharging air through the opening 28. Heat losses in the furnace indicated at 14 are also small as practically all radiant and conducted heat is absorbed by the air before the gases of combustion can discharge through the stack 18.

Another important feature of the present invention is a structure which permits the product to be dried to be readily entered and removed. This is due to the tunnel employed and the trackway extending therethrough; this arrangement permitting the trucks to be advanced progressively through the tunnel and without entering the same, a feature which is certainly desirable when it is considered that the work of loading and unloading and removing from place to place requires considerable physical exertion; or, in other words, work which can be more efficiently accomplished exterior of the tunnel than within the heated portion of the same. Labor efficiency should therefore be greater and the time required in handling and transferring the product, etc. should be proportionately less.

Another important feature is the provision of means for automatically regulating the humidity of the air, the temperature of the same and insuring a thorough mixing of both humid and dry air. The automatic regulation of humidity is practically obtained by the adjustment of the dampers 22 and 20. Thorough mixing is obtained by the blower as the air is repeatedly passed therethrough and temperature regulation is also obtained by the damper control. All fruit or other products handled are thus subjected to a drying medium under ideal conditions and a uniform product is obtained in a minimum of time and with a comparatively small expenditure of power and fuel.

Among other outstanding features is a structure low in cost and construction and operation; further a structure in which complicated machinery and controls are practically eliminated.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may indicate or varying uses may demand.

Having thus described my invention, what I claim and desire to secure by Letters Patent is—

1. A dehydrator comprising an elongated housing having a pair of parallel compartments formed therein separated by a partition wall, one compartment forming a furnace chamber and a return flue and the other compartment a dehydrating tunnel, a transverse duct formed in the housing connecting one end of the furnace chamber and the drying tunnel, a blower disposed at one end of the furnace chamber, the suction side of the blower connecting with the furnace chamber, and the discharge side of the blower connecting with one end of the transverse duct, said duct being disposed below the floor level of the respective compartments, air deflecting means disposed in the drying tunnel and forming a partial covering for the discharge end of the transverse duct, a passage formed in the partition wall at the opposite end of the drying tunnel and the furnace chamber and connecting the two chambers to permit a continuous circulation of air through the furnace chamber and drying tunnel and the communicating transverse duct, means in the partition wall opening for regulating the amount of air recirculated, means for discharging a part of the air circulated, means for admitting exterior air to the furnace chamber, and air heating means disposed in the furnace chamber.

2. A dehydrator comprising an elongated housing having a pair of parallel compartments formed therein separated by a partition wall, one compartment forming a furnace chamber and a return flue and the other compartment a dehydrating tunnel, a transverse duct formed in the housing connecting one end of the furnace chamber and the drying tunnel, a blower disposed at one end of the furnace chamber, the suction side of the blower connecting with the furnace chamber and the discharge side of the blower connecting with one end of the transverse duct, said duct being disposed below the floor level of the respective compartments, air deflecting means disposed in the drying tunnel and forming a partial covering for the discharge end of the transverse duct, a passage formed in the partition wall at the opposite end of the drying tunnel and the furnace chamber and connecting the two chambers to permit a continuous circulation of air through the furnace chamber and drying tunnel and the communicating transverse duct, a damper disposed in said opening, an air inlet opening formed in the housing communicating with the furnace chamber, a damper disposed in said opening, means for adjusting the position of said damper and the first named damper in unison, an air discharging opening formed in the housing and communicating with the drying tunnel, and air heating means disposed in the furnace chamber.

3. A dehydrator comprising an elongated housing having a pair of parallel compartments, formed therein separated by a partition wall, one compartment forming a furnace chamber and a return flue and the other compartment a dehydrating tunnel, a transverse duct formed in the housing connecting one end of the furnace chamber and the drying tunnel, a blower disposed at one end of the furnace chamber, the suction side of the blower connecting with the furnace chamber and the discharge side of the blower connecting with one end of the transverse duct, said duct being disposed below the floor level of the respective compartments, air deflecting means disposed in the drying tunnel and forming a partial covering for the discharge end of the transverse duct, a passage formed in the partition wall at the opposite end of the drying tunnel and the furnace chamber and connecting the two chambers to permit a continuous circulation of air through the furnace chamber and drying tunnel and the communicating transverse duct, a damper disposed in said opening, an air inlet opening formed in the housing communicating with the furnace chamber, a damper disposed in said opening, means for adjusting the position of said damper and the first named damper in unison, an air discharging opening formed in the housing and communicating with the drying tunnel, air heating means disposed in the furnace chamber, a trackway extending through the drying tunnel, and a door at each end of the drying tunnel forming a closure therefor.

4. A dehydrator comprising two elongated parallel tunnels intercommunicating at their ends only, one tunnel forming a furnace chamber and the other a drying tunnel, means to circulate air through the drying tunnel and furnace chamber, means to discharge a portion of the circulating air from the drying tunnel, means to admit outside air to the furnace chamber adjacent that end thereof at which the circulating air moves from the drying tunnel into the furnace chamber, and heating means within the furnace chamber, such heating means originating at that end of the chamber at which the circulating air from the drying tunnel and the outside air enter the furnace chamber and extending thence through a major portion of the length of the furnace chamber.

5. A dehydrator comprising two elongated parallel tunnels lying side by side and both tunnels being of the same length and of substantially the same cross sectional area, such tunnels intercommunicating only at their ends, one tunnel forming a furnace chamber and the other a drying tunnel, means to circulate air through the drying tunnel and furnace chamber, means to allow a portion of the circulating air to discharge from the drying tunnel adjacent that end thereof at which the circulating air moves from the drying tunnel into the furnace chamber, means to admit outside air into the furnace chamber immediately at that end thereof into which the circulating air enters from the drying tunnel and heating means within the furnace chamber, such heating means originating at that end of the chamber at which the circulating air from the drying tunnel and the outside air enter the furnace chamber and extending thence through a major portion of the length of the furnace chamber, whereby the recirculated air and fresh air will both be in contact with each other and with the heating means from the moment they enter the elongated furnace chamber and for the greater portion of the length thereof.

ROMOLO L. PUCCINELLI.